March 12, 1935.  W. F. GROENE ET AL  1,993,995
ORBITAL LATHE
Filed Sept. 30, 1933   4 Sheets-Sheet 1
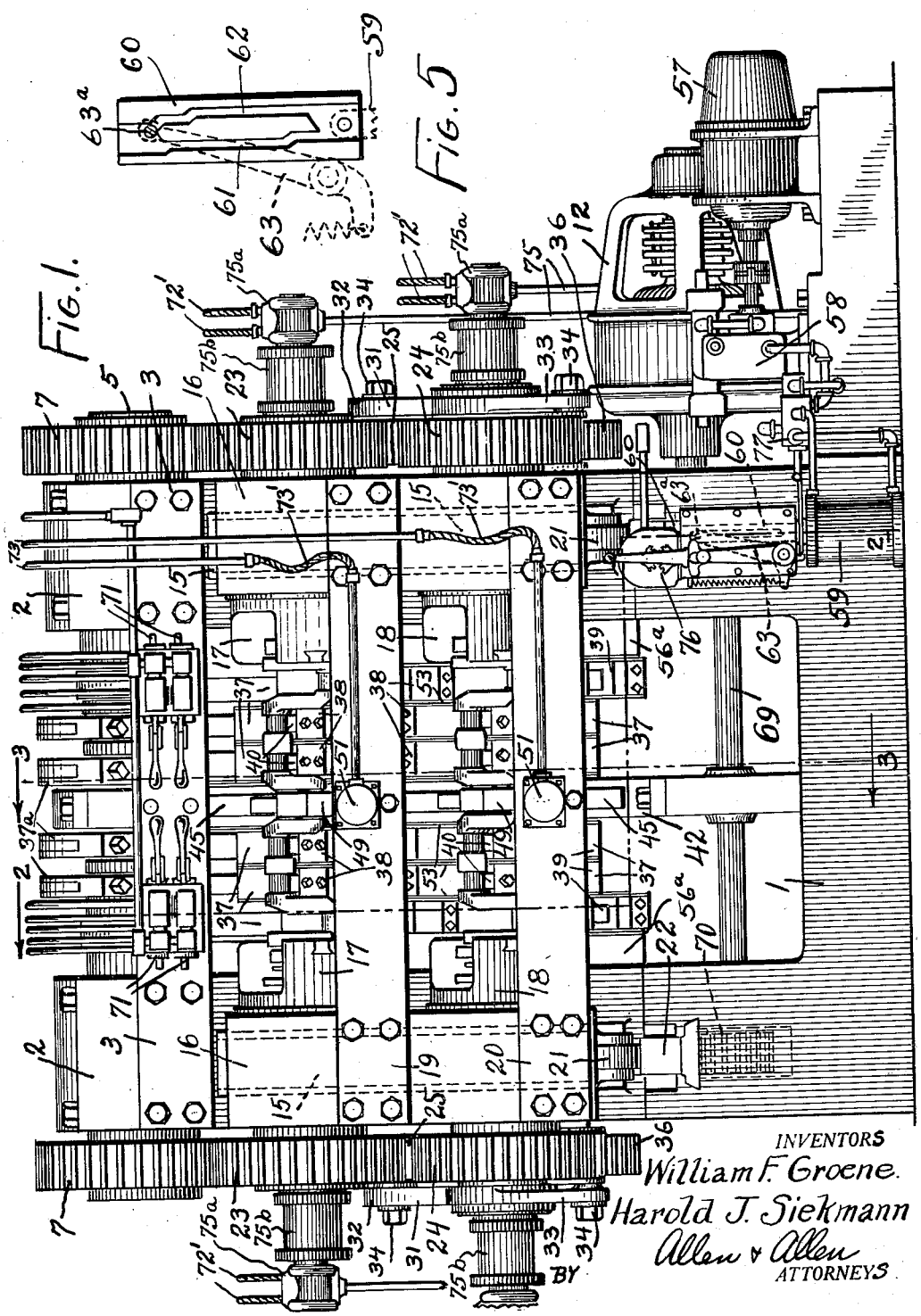
INVENTORS
William F. Groene.
Harold J. Siekmann
BY Allen & Allen
ATTORNEYS

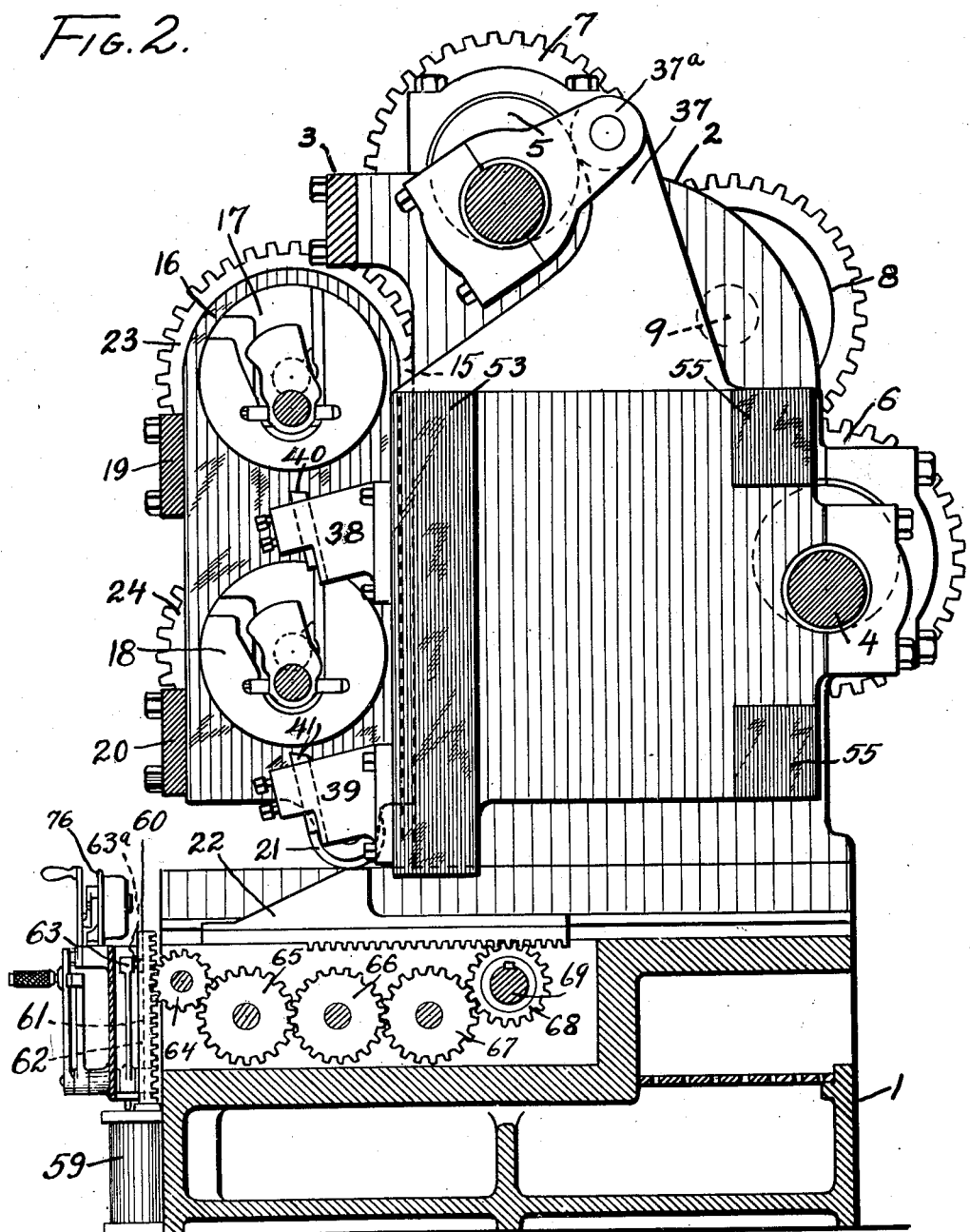

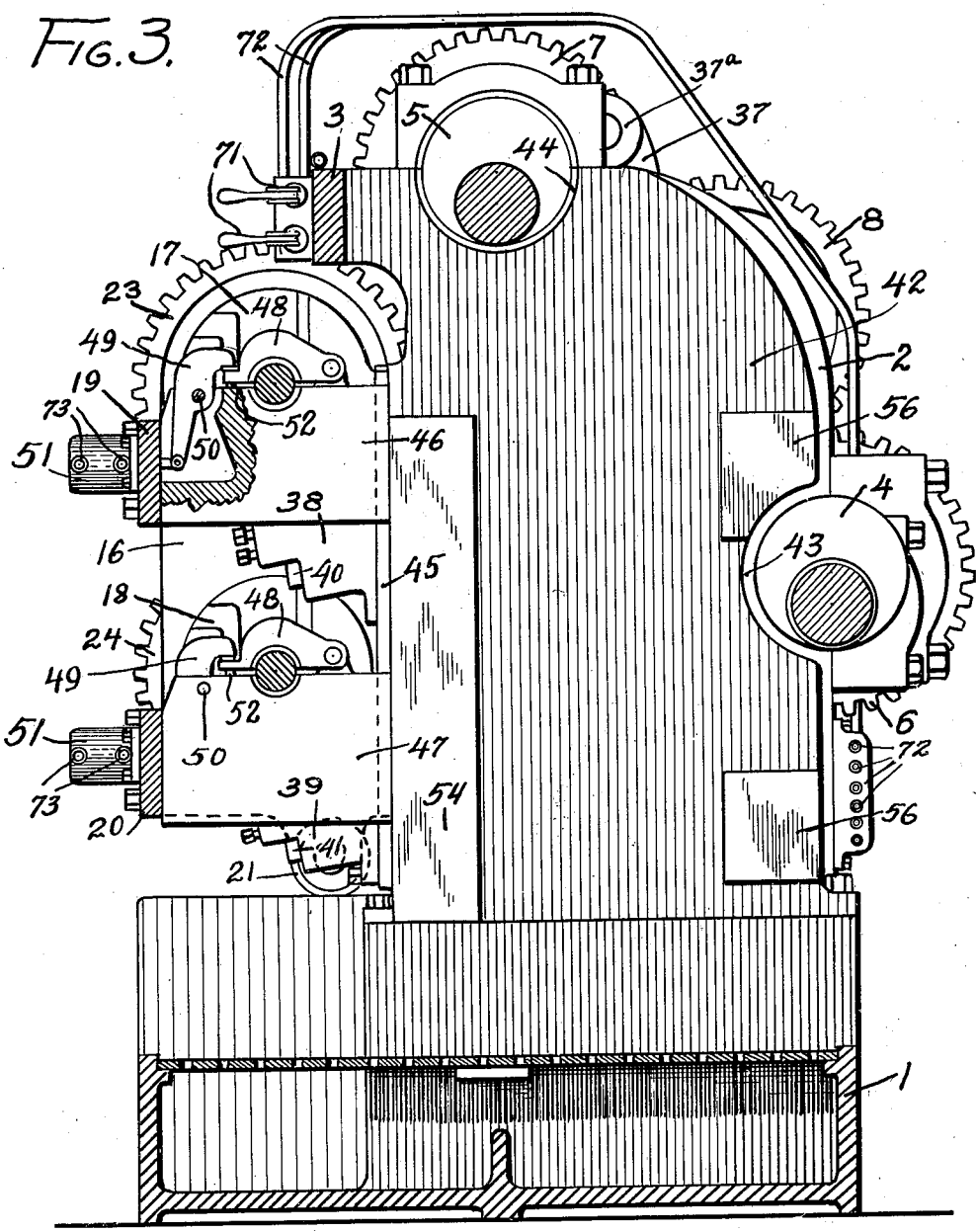

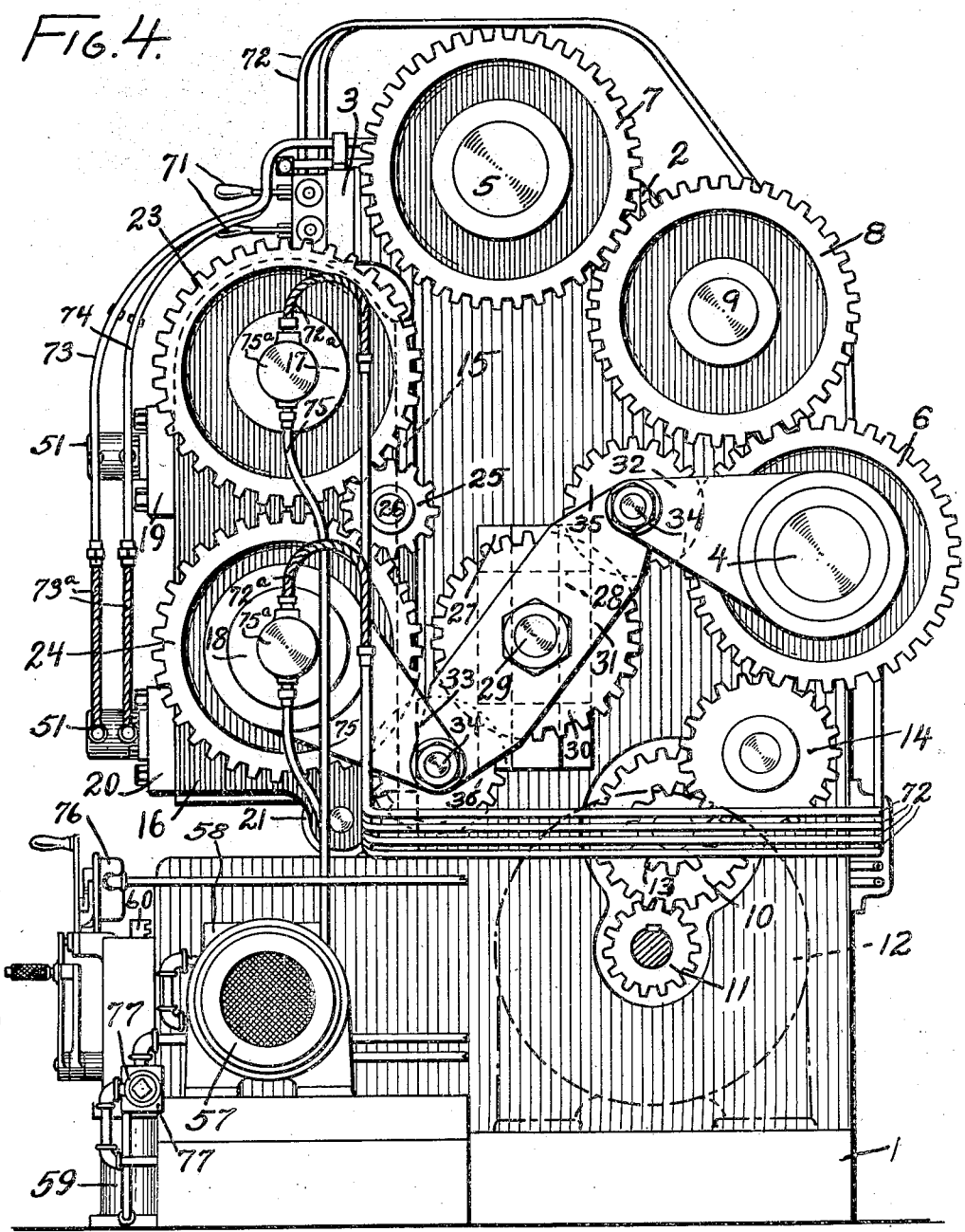

Patented Mar. 12, 1935

1,993,995

UNITED STATES PATENT OFFICE 1,993,995

ORBITAL LATHE

William F. Groene and Harold J. Siekmann, Cincinnati, Ohio, assignors to The R. K. Le Blond Machine Tool Company, Cincinnati, Ohio, a corporation of Delaware Application September 30, 1933, Serial No. 691,710

20 Claims. (Cl. 82—9)

Our invention relates to crankshaft pin turning lathes, wherein all of the connecting rod pins of a multiple throw crankshaft are finished in one turning operation.

Certain constructions illustrated or referred to in this application are disclosed and claimed in Reissue Patent No. 18,662, of November 22, 1932, Patent No. 1,921,919, of August 8, 1933, Patent No. 1,878,130, September 20, 1932, Patent No. 1,888,434, of Oct. 4, 1932, and copending applications, Serial No. 641,244, Serial No. 565,144 and Serial No. 687,447.

In previous machines of this type for turning a plurality of crankshafts simultaneously, except that disclosed and claimed in our copending application, Serial No. 687,447, above mentioned, the crankshafts were held in chucks which revolved on fixed axes, and the orbitally moving tools were fed to the work by a movement additional to their orbital movement.

In our present invention, as in our copending application just mentioned, the tools have no movement specific for the cutting feed, though they do travel in an orbital path, and the chucks, with the work, are moved to the tools for the cutting feed. In that application the chucks are swung along an arc extending in the general direction of the arrangement of the chucks and tools. In the present invention, the chucks are moved in a straight line in the same general direction. As is the case in the previous application, this makes possible a more rigid machine in that while the tool carrying frames are only orbital in motion, ample provision may be made to prevent lateral displacement from their orbital paths; and loading and feeding are simplified.

Our object, in the present invention, is to simplify the construction, and the feeding and loading operations, not only as compared with machines prior to our invention in the last mentioned copending application, but as compared with the invention in that application, by the straight line feeding as above mentioned. In conjunction with this we also provide, different from that in that application, transmission means between the orbital movement mechanism and the chuck rotating mechanism; this transmission means being similar to that disclosed and claimed in Patent No. 1,880,434, before mentioned, with certain novel constructions peculiar to its use in the present combination. We also have changed the arrangement of the steady rest locking mechanism and of the steady rest support in conformity with our improvement for straight line feeding of the work to the orbitally moving tools.

Other objects will appear in the course of the following description, illustrated by the accompanying drawings, in which—

Figure 1 is a front elevation of a machine embodying our invention.

Figure 2 is a front-to-rear cross section on the line 2—2 of Fig. 1.

Figure 3 is a similar cross section on the line 3—3 of Fig. 1.

Figure 4 is an elevation of the end of the machine that is at the right hand side in Fig. 1, the main driving motor being indicated by broken lines only.

Figure 5 is a detail of the feed control cam.

The machine has a base 1, the end frames 2, and a tie bar 3 for the end frames. The lower master crankshaft 4 and the upper master crank shaft 5 are journaled in the end frames 2; the upper shaft 5 being forward from the vertical plane of the lower shaft 4, and these shafts having fixed on their outer ends, outside both end frames 2, gears 6 and 7, respectively. Each two gears 6 and 7 at a respective end of the machine mesh with an intermediate gear 8 turning on a stud shaft 9, fixed in the end frame 2. The right hand end frame 2, near its rear lower corner, is recessed to contain a pair of gears 10 and 11, the lower one being smaller and fixed on the shaft of the main driving motor 12, and the upper, larger gear 10, meshing with the smaller one 11, having a smaller gear 13 meshing with an intermediate gear 14, which meshes with the gear 6 of the lower master crank shaft 4. It will be understood that the necessary equipment for control of the motor 12, though not illustrated, is provided as usual.

Each end frame 2 has vertically extending on its front edge a guide 15 of dovetail cross section. Work carrying members 16 have in their rear edges slots of dovetail cross section receiving the respective guides 15, so that these members 16 are accurately guided to slide up and down thereon. Each member 16 has journaled in bearings, one above the other, two hydraulically operated chucks 17 and 18, preferably similar to those disclosed and claimed in Patent No. 1,878,130, previously mentioned. The two work carrying members are tied together on their front edges by upper and lower tie bars 19 and 20, respectively. Each of these members has at its lower rear corner a projection in which is journaled a roller 21 that bears on a respective cam bar 22 as will later be described.

The chucks 17 and 18 have spindles projecting out from their bearings in the members 16, on which are fixed gears 23 and 24, respectively, meshing with an intermediate pinion 25 turning on a stud 26 carried by the respective member 16. Vertical guides 27 are formed on the sides of slots in the end frames 2, on which blocks 28 are slidably mounted, each with a stud 29 on which turns a middle gear 30 and on which is pivoted a yoke 31 with its opposite end parts connected pivotally to end parts of arms 32 and 33 by studs 34. The arms 32 and 33 swing concentrically with the lower master crankshaft 4 and the lower chuck driving gear 24, respectively; and the pivot studs 34 carry small gears 35 and 36 both meshing with the middle gear 30 and, respectively, with the master crank gear 6 and the chuck driving gear 24. The arrangement is such that these small gears 35 and 36 are planetary to each of the two gears 30 and 6, and 30 and 24, which they connect. This is according to the invention disclosed and claimed in Patent No. 1,880,434, before mentioned; serving here to transmit the rotation of the master cranks to the chucks, synchronously, and while the work carrier 16 slides up and down in the feeding and return movement. The blocks 28 slide up and down and the connecting gears 35 and 36 swing around the other gears, maintaining the operative connection at all positions of the work carrier 16.

The tool carriers 37, one for each crank pin of a shaft that is being turned, are mounted on respective crank pins of the lower master crankshaft 4, and are connected by links 37a with respective crank pins of the upper master crankshaft 5; these links merely affording freedom of expansion and contraction of the tool carriers and the tool carriers having their postures maintained throughout their orbital movements imparted by the master crankshafts, as in prior patents above referred to. Each tool carrier 37 has fixed on its front edge the tool blocks 38 and 39, carrying tools 40 and 41 presented upwardly toward the axes of the crankshafts held by the upper chucks 17 and the lower chucks 18, respectively. The arrangement is such that as the work carriers 15 descend, the crank pins of the crank shafts are moved toward the respective tools 40 and 41, which have the same orbital movement of the pins of the crankshafts being turned; this constituting the feed of the lathe. Between the two middle tool carriers 37 is the steady rest guide support 42, most clearly seen in Fig. 3 as being fixedly mounted on the base 1 of the machine and being notched at the rear, at 43, and at the top, at 44, to accommodate portions of the master crankshafts 4 and 5, respectively, that lie between the crank-pin portions thereof. This steady rest guide support is tied to the end frames by the bar 3 that ties the end frames together as before described. Below this tie bar 3 this support 42 has the vertical guide 45, of dovetail cross section. Steady rest members 46 and 47 for the work in the chucks 17 and 18, respectively, have correspondingly shaped slots in their rear edges, receiving the guide 45. These steady rest members are tied to the work carriers 16 by the bars 19 and 20 that tie the work carriers together as before described.

Each steady rest member has in its upper edge a bearing recess in which the middle line bearing of the respective crankshaft is held but allowed to turn, by clamp members 48 held down by latches 49 in the form of levers, each fulcrumed at 50 in a slot in the upper front portion of the respective steady rest, in which slot the lower arm of the lever swings. This lower arm is pivoted to the stem of the plunger of a respective hydraulic cylinder 51 mounted on the front of the respective tie bar 10 or 20. The operator closes the clamp member 48 over the shaft, and then by applying the hydraulic pressure the latch is powerfully actuated to hold the latch down over the clamp member, which has its downward movement limited by a stop 52 to provide just the right running fit of the line bearing of the crankshaft in the steady rest.

On the inner sides of the end frames are thrust plates 56a, and on each side of each tool carrier 37 and of the steady rest guide support 42, to afford accurately fitting flat bearings, are smooth flat bearing plates, one long vertical plate at the front portion, as the plate 53 on the tool carrier (Fig. 2) or the plate 54 on the steady rest support (Fig. 3), and short upper and lower plates, as the plates 55 on the tool carrier (Fig. 2) or the plates 56 on the steady rest support (Fig. 3). By the above construction the series of tool carriers 37 and the steady rest support 42 form an uninterrupted mass of metal across the machine from one end frame 2 to the other. This arrangement prevents lateral displacement of the orbitally moving tool frames, reducing possibility of inaccuracy of the tool operation.

The base has an extension to the right as seen in Fig. 1, on which is a motor 57 driving a suitable commercial hydraulic pump 58, also mounted on this extension. This is a pump which, by construction and operation well known in the art, is capable of furnishing large volume of fluid at high pressure for chucking and rapid traverse of the feed device, and also low volume of fluid at high pressure for the feeding operation; one example being a pumping unit made by Vickers, Incorporated. Such a unit comprises valves arranged to control the output thereof to afford the above mentioned effects, and being well known in the art is believed to require no special illustration or description. A hydraulic cylinder 59 is mounted on a vertical axis, on the front of the base 1 and having its piston connected to a vertically extending combined cam and rack member 60 above the cylinder. This member 60 has in its front face cam grooves 61 and 62 receiving a roller 63a carried on the free end part of a lever 63 pivoted on the base 1 at one side of the member. As the construction and operation of this cam device is like that in Reissue Patent No. 18,662, and in copending applications Serial Nos. 565,144, 641,244 and 687,447, it is deemed unnecessary to describe it further than to state its functions in the present invention. The rear side of the member 60 is in the form of a rack. A train of gears consisting of the small gear 64 meshing with the rack, three gears 65, 66 and 67, the first of which meshes with the small gear 64 and the others of which succeed rearwardly in meshing relation, and a fourth gear 68 meshing with the rearmost of the three. This fourth gear is fixed on a shaft 69 which is journaled in the side of the chamber occupied by these gears in the bed 1 and extends toward the other end of the machine where it is journaled in the wall of a similar chamber, wherein it has fixed on it a similar gear 70. The cam bars 22, previously mentioned, slide in guides along the tops of the respective chambers and have on their lower sides rack teeth meshing with respective gears 68 and 70. The tops of these cam bars 22, where the rollers 21 bear on them, are inclined downwardly and forwardly, so that a forward movement of the cam bars raises the work carriers 16, and a rearward movement permits them to descend by gravity for the feeding of the work to the tools.

Mounted on the top tie bar 3 at the front of the machine are four control valves 71, all alike, which admit liquid from the pump 58 to the operating devices of the respective work holding chucks 17 and 18 at each end of the lathe, and to the steady rest locking devices. The pump 58 driven constantly during use of the lathe; stopping to change work pieces having no effect on this operation. In our prior application, Serial No. 687,447, we set forth and claim means whereby operation of control valves such as the valves 71 controls supply of current to the main driving motor 12 that drives the master crankshafts and the work holding chucks as before described; and it will be understood that such means is applicable to our present lathe, although not illustrated herein. The supply and return pipes 72 and 72a to the chuck operating devices, and the supply and return pipes 73 to the steady rest locking devices, are made partly of flexible sections, as at 72' and 73', respectively, on account of the up and down movement of these devices relative to the pressure supply means and the valves 71; as also are the return pipes 74 of the steady rest locking devices. The pipes 75 that return slight seepage of oil from the rotary pressure inlet joints 75a of the chuck operating cylinders 75b are permitted to extend loosely down into the reservoir that receives the returned liquid, thus allowing these drain pipes to move up and down with the work carrier and chucks. Such rotary joints with provision for drain of seepage are disclosed and claimed in copending application, Serial No. 687,447, filed Aug. 30, 1933.

The starting switch 76 for the main driving motor 12 is shown at the top of the feed control cam device. Electrical devices which will operate in conjunction with the valves 71 are disclosed and claimed in the application just mentioned, and it will be understood that they may be used without present invention though not shown herein. These include switches in circuit with the starting switch 76 and the motor so that the motor 12 cannot be started unless the work is held securely by the chucks and steady rests.

As shown in Fig. 2 the work carriers 16 are at their highest positions, and after the work has been loaded and secured in place, the lathe may be started by closing switch 76. Feed control lever 63 then is thrown so that its roller 63a follows groove 61, moving lever 63 as member 60 rises by pressure in the cylinder 59, admitted by the initial movement of the lever; so that the rate of feed is varied by lever 63 acting on control valve 77 of the pump 58. As this device is disclosed and claimed in prior patents before mentioned, detailed description and illustration of it is not believed to be here necessary. It provides rapid traverse, coarse feed, fine finishing feed and then quick return as the roller 63a goes from groove 61 to groove 62, stopping the feed action at the initial starting point at top of cam grooves 61 and 62, ready for a succeeding piece of work.

These motions are imparted to the work carriers 16 by the rack teeth of member 60 and the gears on the cam member 22, first moving rearwardly from the position shown in Fig. 2, withdraws its slanting top so that the respective work carrier 16 moves down at the varying rates of movement imparted to the cam member 22 as above described; the roller 21 rolling down the cam surface. Then, for return, as the valve control lever roller 63a enters cam groove 62, the cam member 22 is slid forward under the action of the gearing connection with cylinder 59, and the slanting top surface raises the work carrier 15 again to the position shown in Fig. 2. As these members 22 work exactly uniformly on both work carriers 16, which are tied to each other and to the steady rests, the work is lowered and turned and is returned to raised position for unloading, in accurate relation to the tool carrying mechanism throughout the operation. When the return of the work upwardly is completed, the operator releases it from the chucks and steady rests by operation of the levers 71, so that it may then be unloaded.

The work carriers 16, operated as above described, and closely guided on the fronts of the end frames 2, while the steady rest are carried with them and similarly guided on the front of the steady rest support, afford a very simple feeding operation, as compared with prior lathes in which the feeding movement is in the orbitally moving tool carriers. The planetary transmission is simple of construction and accurate in operation. Owing to the movement of the work carriers, there is an added rotation and a subtracted rotation of the work relative to the master cranks; but this is arranged so that, at the end of the finishing feed the cut is truly cylindrical. This is a condition that exists in prior lathes, such as in certain patents above mentioned, where it is compensated for in the same manner. In our present arrangement for feeding, the arrangement of the hydraulic operating devices is permitted to be simpler than in prior arrangements, also.

It will be understood that we are not limited to the precise disclosure herein, but claim:

1. In an orbital lathe for turning a plurality of crank pins on each one of a plurality of crankshafts simultaneously, tool supports, one for each crank pin on a shaft, a work support, a plurality of work holders rotatable on parallel axes on said work support, one for each shaft, a plurality of tools on each tool support, at least one for each work holder, said work support being movable in a straight line, and the tools being arranged on the tool supports for approach of the work holders to the respective tools along said straight line, and means carrying the tool supports and operatively connected to the work holders, imparting orbital movements to the tool supports in synchronism with the rotations of the work holders.

2. In an orbital lathe for turning a plurality of crank pins on each one of a plurality of crankshafts simultaneously, tool supports, one for each crank pin on a shaft, a work support, a plurality of work holders arranged in a straight line on said work support and rotatable on parallel axes, one for each shaft, a plurality of tools on each tool support, at least one for each work holder, arranged in straight lines on the respective tool supports parallel with the line of arrangement of the work holders, said work support being movable parallel with said lines of arrangement for approach of the work holders to the respective tools along said lines, and means carrying the tool supports and operatively connected to the work holders, imparting orbital movements to the tool supports in synchronism with the rotations of the work holders.

3. In an orbital lathe, a work support and a tool support, a work holder rotatable on said work support, means imparting an orbital movement to said tool support in a plane at right angles to the work holder axis in synchronism with the rotation of the work holder, and a tool carried on said tool support, said work support being mounted to move in a straight line along said plane to move the work holder to and from the tool, and a steady rest device movable with the work support.

4. In an orbital lathe, a work support and a tool support, a work holder rotatable on said work support, means imparting an orbital movement to said tool support in a plane at right angles to the work holder axis in synchronism with the rotation of the work holder, a tool carried on said tool support, a steady rest support alongside said tool support, and a steady rest device, said work support and said steady rest device being mounted to move in a straight line along said plane to move the work to and from the tool, said steady rest device being guided on said steady rest support for its straight line movement.

5. In an orbital lathe, a work support and a tool support, a work holder rotatable on said work support, means imparting an orbital movement to said tool support in a plane at right angles to the work holder axis in synchronism with the rotation of the work holder, a tool carried on said tool support, and a steady rest device, said work support and said steady rest device being connected as a unit and being movable in a straight line along said plane to move the work to and from the tool.

6. In an orbital lathe, a work support movable in a straight line, a work holder rotatable on said work support, a tool support, rotary means imparting an orbital movement to the tool support, gears rotating, respectively, with the work holder and said rotary means, gear means planetary to both gears, confining the rotary means and the work holder to synchronous rotation, and means for moving the work support along a straight line to move the work to and from the tool support, and a tool on the tool support, acting on the work as the work support moves toward the tool support.

7. In an orbital lathe, a series of rotary work holders and a series of tools, both series being arranged along a straight line, and means for relatively moving the two series along said straight line to effect a relative feeding movement of the work holders and the tools, said lathe including means to rotate the work holders and to move the tools in orbital paths in synchronism with the rotations of the work holders.

8. In an orbital lathe, a series of rotary work holders and a series of tools, both series being arranged along a straight line, means to move the tools in orbital paths in synchronism with the rotations of the work holders, and means for moving the series of work holders along said straight line to effect a feeding movement of the work to the tools.

9. In an orbital lathe, a series of rotary work holders and a series of tools, both series being arranged along a straight line, a series of steady rest devices arranged along said straight line, means to move the tools in orbital paths in synchronism with the rotations of the work holders, and means for relatively moving the work holders and the steady rest devices as one unit and the tools as another unit, along said straight line, to effect a relative feeding movement of the work holders and the tools.

10. In an orbital lathe, a series of work holders and a series of tools, means to rotate the work holders and move the tools in orbital paths in synchronism, both series being arranged along a straight line, steady rest devices arranged along said straight line, and means to move the work holders and the steady rest devices as a unit, relatively to the series of tools, to effect a relative feeding movement of the work holders and the tools.

11. An orbital lathe as set forth in claim 10, in which the movement of the work holders and steady rest devices relative to the tools is along the straight line of arrangement of the work holders, steady rest devices and tools.

12. In an orbital lathe, spaced end frames, vertical guides on the respective end frames, work supports slidable up and down on the respective guides, means connecting the work supports as a unit, work holders rotatably mounted in the respective work supports in axial alinement, a tool support, rotary means mounted in the end frames and supporting said tool support to impart orbital movement thereto, a tool carried by the tool support in the path of movement of work held by the work holders, means for limiting said work holders and said rotary means to synchronous rotation, and means for imparting the up and down movement of the work supports to feed the work to and from the tool.

13. A lathe as set forth in claim 12, in which the means for moving the work supports up and down comprises sliding cams guided in the respective end frames and having inclined surfaces on which the work supports are supported, and means for sliding the cams.

14. A lathe as set forth in claim 12, in which the means for limitng the rotations of the work holders and the rotary means comprises gears with which the respective work holders rotate and gears with which said rotary means rotates, a middle gear between each work holder gear and the corresponding gear of the rotary means, a support for each middle gear, slidable up and down in the respective end frame, a yoke turning coaxially with each middle gear, arms turning coaxially with the respective other two gears between which the middle gear is located, said yoke and said arms turning independently of the respective gears, pivots connecting the opposite end parts of the yoke to the free end parts of the respective arms, and gears turning coaxially with but independently from the respective pivots, meshing with and planetary to the middle gear and the respective other two gears.

15. A lathe as set forth in claim 12, in which each work holder is provided with hydraulically operated means for engaging or releasing the work, and in which there is included a hydraulic pressure exerting means, flexible liquid conducting means from said pressure exerting means to the respective means of the work holders, and drainage liquid conducting means leading from the work holder means along the line of movement of the work holders and a reservoir into which said drainage liquid conducting means discharge and relatively to which they are movable along said line of movement.

16. A lathe as set forth in claim 12, including a steady rest device unitary with the work supports, and a support having a vertical guide on which the steady rest device is slidable up and down with the work supports.

17. A lathe as set forth in claim 12, including a steady rest device connected to the work supports to move up and down therewith, locking means for said steady rest device, hydraulically operated means for actuating the locking means, pressure exerting means, and flexible connections from said hydraulically operated means for flow of liquid to the last mentioned means from the pressure exerting means, and for flow of liquid from said last mentioned means.

18. In an orbital lathe, spaced end frames, a steady rest support between the end frames, at least one tool support between each end frame and the steady rest support, said steady rest support and said tool supports being in intimate lateral guiding contact with each other and with the respective end frames, means for moving the tool supports in orbital paths, work supports slidable up and down on the respective end frames, a steady rest device slidable up and down on the steady rest support, and connected to the work supports to slide therewith, means for sliding said work supports and said steady rest device up and down, work holders rotatable on alined axes in the respective work supports, tools on the respective tool supports in the path of movement of work carried up and down with the work holders, and means for limiting the orbital movements of the tool holders and the rotation of the work holders to a synchronized relation.

19. In a lathe, a plurality of rotary work holders movable in a straight line and arranged along the line of movement, and a plurality of tools arranged along said line of movement in the paths of the respective work pieces held in the work holders, to act on the respective pieces as they are approached by the pieces.

20. A lathe as set forth in claim 19, in which there are included steady rests, one for each work holder, movable as a unit with the work holders along the straight line of movement of the work holders.

WILLIAM F. GROENE.
HAROLD J. SIEKMANN.